US011670075B2

(12) United States Patent
Stefan

(10) Patent No.: US 11,670,075 B2
(45) Date of Patent: Jun. 6, 2023

(54) ADAPTATION OF PASSAGE BETWEEN TWO VEHICLES

(71) Applicant: Ford Global Technologies, LLC, Dearborn, MI (US)

(72) Inventor: Frederic Stefan, Aachen (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 135 days.

(21) Appl. No.: 17/023,846

(22) Filed: Sep. 17, 2020

(65) Prior Publication Data

US 2021/0086793 A1  Mar. 25, 2021

(30) Foreign Application Priority Data

Sep. 19, 2019  (DE) .......................... 102019125245.8

(51) Int. Cl.
*B60W 60/00* (2020.01)
*B60W 40/04* (2006.01)
*G06K 9/00* (2022.01)
*G08G 1/0967* (2006.01)
*G08G 1/0968* (2006.01)
*G06V 10/764* (2022.01)
*G06V 20/56* (2022.01)
*G06V 40/20* (2022.01)
*G06V 10/82* (2022.01)

(52) U.S. Cl.
CPC ........... *G06V 10/764* (2022.01); *B60W 40/04* (2013.01); *B60W 60/0017* (2020.02); *G06V 10/82* (2022.01); *G06V 20/56* (2022.01); *G06V 40/20* (2022.01); *G06V 40/23* (2022.01); *G08G 1/096725* (2013.01); *G08G 1/096883* (2013.01); *B60W 2554/402* (2020.02); *B60W 2554/4045* (2020.02)

(58) Field of Classification Search
CPC .. B60W 30/06; B60W 40/04; B60W 60/0017; B60W 2510/18; B60W 2510/20; B60W 2554/00; B60W 2554/402; B60W 2554/4045; G06K 9/6271; G06V 10/82; G06V 20/56; G06V 40/20; G06V 40/23; G08G 1/0175; G08G 1/096725; G08G 1/096883; G08G 1/168
See application file for complete search history.

(56) References Cited

U.S. PATENT DOCUMENTS 9,829,889 B1  11/2017  Kusano et al.
10,055,653 B2  8/2018  Cohen et al.
(Continued)

FOREIGN PATENT DOCUMENTS

WO  2016126318 A1  8/2016

*Primary Examiner* — Peter D Nolan
*Assistant Examiner* — Ce Li Li
(74) *Attorney, Agent, or Firm* — Frank A. MacKenzie; Bejin Bieneman PLC

(57) ABSTRACT

An intention of a road user to traverse a passage between a first vehicle and a second vehicle is determined. A required width of the passage is determined based on a nature of the road user. A current width of the passage is determined. Upon determining the current width of the passage is less than the required width of the passage, a drive of at least one of the first vehicle or the second vehicle is actuated to increase the current width of the passage at least to the required width of the passage.

20 Claims, 3 Drawing Sheets

(56) References Cited

U.S. PATENT DOCUMENTS

| | | | |
|---|---|---|---|
| 2015/0291157 A1* | 10/2015 | Beaurepaire | B60W 30/06 |
| | | | 701/23 |
| 2017/0371340 A1* | 12/2017 | Cohen | G05D 1/0246 |
| 2020/0198634 A1* | 6/2020 | Yashiro | G08G 1/16 |
| 2021/0065538 A1* | 3/2021 | Tamura | G08G 1/166 |
| 2021/0110484 A1* | 4/2021 | Shalev-Shwartz | |
| | | | G01C 21/3407 |

* cited by examiner

ADAPTATION OF PASSAGE BETWEEN TWO VEHICLES

CROSS-REFERENCE TO RELATED APPLICATIONS

This patent application claims priority to German Application No. DE102019125245.8 filed Sep. 19, 2019, which is hereby incorporated by reference in its entirety.

BACKGROUND

The number of autonomously driving vehicles and vehicles which are automatically controlled or assisted by driver assistance systems at least in certain driving situations is continuously increasing.

For example, more and more vehicles have parking assistance systems and/or congestion assistance systems. These systems permit driving maneuvers to be carried out even in a very small space with very little distance to other vehicles. Parking assistance systems enable, for example, the parking of the vehicle even in very tight parking spaces. Congestion assistance systems, which offer assistance during stop-and-go driving, are capable of bringing the vehicle at the end or in a line of cars to a standstill very close to the vehicle traveling ahead when it stops. In both cases, situations can occur which make it difficult or impossible for other road users, for example, bicyclists or pedestrians, in particular if they are carrying additional baggage or a stroller or the like or are underway in groups, for example, school classes, to pass between the vehicles and to cross the roadway, since the passage, i.e., the distance between two vehicles, thus the width of the gap between the vehicles, is not sufficient to let through the road user who wishes to cross the roadway. In the case of congestion, it can also occur that vehicles come to a standstill in the region of pedestrian crossings, for example, at crosswalks or at traffic signals. Other vehicles who are obstructed, for example, by parked vehicles or vehicles in a traffic jam from driving off of their property, their parking area, or their garage to the roadway, can also be road users who have a need for a sufficiently large passage between two vehicles on the roadway.

A driver assistance system is described in U.S. Pat. No. 10,055,653 B2, in which an autonomously driving vehicle monitors the gaps between vehicles parked at the roadway edge and adapts its driving course, i.e., increases its distance to the parked vehicles as it drives by as much as possible if a pedestrian is discovered in a gap or the gaps are at least wide enough that a pedestrian could step out from them to cross the roadway.

A method is disclosed in WO 2016/126318 A1 to adapt the driving of an autonomously driving vehicle based on location data of mobile telephones. Position and velocity data of pedestrians are determined based on position data from their mobile telephones and matched with the course and the velocity of the autonomously driving vehicle and the course is corrected in the event of possible overlap.

A signaling system for autonomously driving vehicles is disclosed in U.S. Pat. No. 9,829,889 B1, in which a vehicle signals to another vehicle or pedestrian that it yields its own right-of-way or that it is now safe to cross the roadway. In this case, an offer signal is sent to the other vehicle or the pedestrian on their mobile telephone using a suitable app, that can then be confirmed thereby.

While these systems are oriented toward adapting the driving of a driving vehicle to the behavior of other road users, the effect of the stationary traffic on other road users is hardly taken into consideration.

SUMMARY

The present disclosure relates to a system for adapting a passage between two vehicles. The disclosed system can provide road users with an option of being able to cross a roadway in a simple manner, even if stationary or parked vehicles obstruct this.

According to a first aspect of the disclosure, a system for adapting a passage between two vehicles comprises a passage need determination device of a first vehicle, designed to determine an intention of a road user to traverse a passage between the first vehicle and a second vehicle, a distance need determination device of the first vehicle, designed to determine a required width of the passage in dependence on a nature of the road user, a distance determination device of the first vehicle designed to determine a current width of the passage, and a distance control device of the first vehicle, designed to check whether the current width of the passage is less than the required width of the passage, and to actuate a drive of at least one of the first vehicle or the second vehicle to enlarge the current width of the passage at least to the required width of the passage.

A system for adapting a passage between two vehicles can consist of a single device on board the first vehicle if the passage need determination device is configured to determine the intention of the road user to traverse a passage between the first vehicle and a second vehicle solely on the basis of its position and behavior.

The system can also comprise a passage need display device, which is carried by the road user and can transmits a signal to the passage need determination device. The distance need determination device is designed to determine the required width of the passage based on a nature of the road user, wherein the nature refers to the dimensions of the road user, which in particular comprises its width or maximum width, for example, in the case of a pedestrian having a stroller, the width of the stroller.

The first and second vehicles are at least temporarily autonomously driving vehicles (for example, controlled by a parking assistance system or a congestion assistance system).

The distance determination device of the first vehicle is designed to determine a current width of the passage, i.e., the distance between the first and second vehicles. For this purpose, the distance determination device comprises, for example, a distance sensor, for example, an optical camera sensor unit, a LIDAR sensor (LIDAR—Light Detection and Ranging), laser sensor, ultrasonic sensor, or radar sensor. The distance can also be determined by transmission via V2X communication (V2X—vehicle to everything, e.g., vehicle to vehicle (V2V), vehicle to infrastructure (V2I), or vehicle to person (V2P)) and matching of position specifications of the vehicles. The second vehicle can be a vehicle in front of the front end of the first vehicle, or also a vehicle behind the rear end of the first vehicle. Depending on the traffic situation, another obstacle or a vehicle which cannot be controlled by the system can also be located at the front end or the rear end. Determining the distance from the sensor data can be carried out, depending on the sensor data, by image analysis and distance calculation, possibly with use of lookup tables, and can be improved in one preferred embodiment by the use of learning methods (for example, deep learning).

The distance control device is configured for the indirect or direct actuation of the drive of the first vehicle to move the first vehicle if needed in order to widen the passage. The system for adapting the passage can also be a networked system, in which control units of the second vehicle or still further vehicles also exchange data signals, for example, via V2V communication, i.e., vehicle to vehicle communication. In such an example, the control unit of the first vehicle is configured, alternatively or additionally to actuating the drive of the first vehicle, to actuate the drive of the second vehicle to thus enlarge the passage between the first and second vehicles. In one embodiment, it can moreover be provided that the first and/or the second vehicle is moved back into the original position after the road user traverses the passage.

The described system offers a road user, e.g., a pedestrian, an option in a simple manner of dynamically providing a passage, i.e., a gap, between vehicles themselves if needed, to be able to cross the roadway there, even if the vehicles are stopped very close to one another, for example, due to the use of assistance systems. The system enables automatic arrangement of the vehicles, wherein the nature of the road user determines the required width of the produced passage. Additionally, the nature of the road user can also determine a duration during which the required width of the passage is at least maintained, so that the road user, for example, the pedestrian having stroller or baggage or the group of people, who wish to cross the roadway jointly, can traverse the passage safely.

In one exemplary embodiment, the passage need determination device of the first vehicle comprises at least one camera sensor unit and a programmable device, which is configured or programmed to detect the road user in current recordings of the camera sensor unit and to determine their intention, e.g., to cross the passage between the first vehicle and the second vehicle. For this purpose, for example, the position and/or the previous movement path of the road user is detected and, for example, from the proximity to the gap, i.e., the passage, between the first and second vehicle it is concluded that the road user has the intention of crossing the roadway there. In this embodiment, it is not necessary for the road user to carry a signal generator with them to communicate their intention to the passage need determination device, so that the system can be implemented in this case as a device on board the first vehicle. Image processing methods are used for evaluating the camera recordings, possibly in combination with neural networks which are trained or are to be trained (for example, CNN—convolutional neural networks, FNN—feedback neural networks, deep learning optimization methods, ML—machine learning), so that road users can be recognized, for example, pedestrians, who are standing at the edge of the roadway or have already begun to cross the roadway. Alternatively or additionally to the use of at least one camera sensor unit, it can be provided that signals of, for example, radar or LIDAR sensors are to be acquired and evaluated.

In one exemplary embodiment, the programmable device is configured to determine the nature of the road user automatically using suitable signal processing algorithms with the aid of current recordings, for example, of an onboard camera sensor unit, of a LIDAR, laser, ultrasound, and/or radar sensor, and to transmit the nature of the road user to the distance need determination device. The nature comprises, e.g., the dimensions or width, for example, specified in meters or centimeters, so that the required width of the passage may be determined. In this case, for example, the width is directly determined. Determining the nature can also comprise, for example, performing a classification on the basis of the external shape or the outline (for example, "single person", "group of persons", "bicycle", "stroller", "baggage", "wheelchair", etc.), wherein then specific road user classes are associated with previously established expected values for their maximum dimensions, in particular their width. In this way, it can be determined solely based on the evaluation of camera recordings whether and how the width of the passage is to be adapted.

In one exemplary embodiment, the programmable device is configured to recognize the intention to traverse the passage based on a gesture of the road user. The gesture can be, for example, the pointing of a pedestrian or bicyclist at the heretofore too narrow passage or at the other side of the roadway. The evaluation of camera recordings and recognition of a gesture which unambiguously indicates the intention of the road user increases the reliability of the system and helps to avoid the passage intention not being recognized and/or the vehicles being moved unnecessarily.

In one exemplary embodiment, the system comprises a passage need display device, which is designed to display an intention of the road user to traverse the passage between the first vehicle and the second vehicle. In this way, the road user can deliberately transmit his intention to the first vehicle or other vehicles of the system and the passage need detection device can be simplified and optimized to acquire passage need display signals.

In one exemplary embodiment, the passage need display device is designed to emit an optical signal to display a passage need in a direction selected by the road user, and the passage need determination device is designed to detect the optical signal and to determine the intention of the road user to traverse the passage. The passage need display device can be, for example, an optical pointing device, for example, a laser pointer or a smart phone which is carried, the light beams of which are detected by the camera sensor unit or another optical sensor when the light beam is oriented thereon by the road user. In further embodiments, it is provided that the road user carries an emitter provided for this purpose as a passage need display device and the vehicles have suitable receivers to receive the emitted signal, as soon the emitter is activated by the road user, or the road user carries a device which can establish a V2X communication connection to the vehicle to be moved in order to signal to it his passage need. In a further embodiment, the road user has a smart phone having a suitable app and the signal is transmitted to the vehicle via a data and/or telephone connection.

In one exemplary embodiment, the system for adapting a passage between two vehicles comprises an operating state determination device of the first vehicle, which is designed to determine an operating state of the first vehicle. The operating state is described here, in addition to the movement state of the vehicle, e.g., by the activation state of automatic control software, for example, a parking assistance system or a stop-and-go driver assistance system. The vehicle can be in a state of parking, for example, and can be in motion at the same time. This information can be used to park the vehicle so that the remaining passage is sufficiently wide for the road user. Depending on the position of the road user, a momentary stop of the parking maneuver can also be provided so as not to shrink the passage or endanger the road user. The vehicle can also, for example, be in a parking state in which the vehicle is already parked and is stationary. The vehicle can also be in a driving state, but can presently be stationary, for example, during control by a congestion assistance system. The vehicle can also be in a waiting state, for example, during a stop at a traffic signal or if the right-of-way is presently granted to another vehicle. In this case, the system ensures that the vehicle is not controlled by another assistance system to start moving again during the process of the passage widening before the road user has completely traversed the passage. To determine the operating state, for example, it is provided that states of the assistance system are queried, for example, via the vehicle bus, or also the vehicle velocity, for example, is queried and possibly road signs or traffic signal phases are taken into consideration by an evaluation of camera recordings or of data obtained by V2I (vehicle to infrastructure) communication.

As already described, a road user can be a pedestrian. Depending on the embodiment of the system, the road user, for whom the passage is supposed to be adapted, is, for example, a pedestrian or a pedestrian with a stroller, a wheelchair user with a wheelchair, a bicyclist with a bicycle, a scooter rider with a scooter, or a motorcycle rider with a motorcycle. Moreover, the term "road user" can refer to a group of pedestrians, bicyclists, etc., or also pedestrians who carry a pet, baggage, or other things to be transported with them. A road user can also be another vehicle with a driver, for example, when leaving a garage or a partially parked-in exit.

In a further embodiment, the passage need display device is a portable programmable device at least having a user interface for inputting the passage need of the road user and a data communication interface of the portable programmable device, designed to transmit at least the passage need at least to the first vehicle, wherein the passage need determination device of the first vehicle comprises a data communication interface designed to receive data from the data communication interface of the portable programmable device, which at least indicates the passage need of the road user. In one exemplary embodiment, the portable programmable device is a smart phone or a tablet PC and is carried by the road user, wherein the portable programmable device executes an app in which the road user can input his passage need, wherein then this is transmitted to the relevant vehicle. In one exemplary embodiment, the app comprises an access to a data service which displays the surroundings of the road user in a bird's eye perspective on a preferably touch-sensitive display screen, i.e., a display, used as a user interface, wherein the road user, for example, a pedestrian, identifies the point at which the passage is to be provided by marking in the displayed surroundings. In one embodiment, vehicles detected in the surroundings (for example, with the aid of V2X communication) are also displayed in the bird's eye perspective and the road user can communicate by marking the desired vehicles which vehicles are supposed to be moved to provide a passage.

In one exemplary embodiment, the user interface of the portable programmable device is additionally designed for the input of the nature of the road user, and the data communication interface of the portable programmable device is also designed to transmit the nature of the road user to the first vehicle. In this manner, the nature of the road user can be directly communicated to the distance need determination device of the first vehicle, whereby the requirements for this are simplified.

In one exemplary embodiment, the system comprises at least one further vehicle adjacent to the first or the second vehicle and having a further distance control device designed to actuate a drive of the further vehicle according to the request by the distance control device of the first vehicle if the current width of the passage between the first and second vehicles cannot be enlarged to the required width of the passage by actuating the drives of the first and second vehicles. This offers the advantage that even if the vehicles are stopped very close to one another, a gap can nonetheless be provided which is sufficient for the road user who requires a passage to be able to cross the roadway.

According to a second aspect of the disclosure, a method is provided for adapting a passage between two vehicles using a system according to the first aspect of the disclosure. The method comprises determining, using a passage need determination device of a first vehicle, an intention of a road user to traverse a passage between the first vehicle and a second vehicle, determining, using a distance need determination device of the first vehicle, a required width of the passage based on a nature of the road user, and determining, using a distance determination device of the first vehicle, a current width of the passage and, if the current width of the passage is less than the required width of the passage, actuating, using a distance control device of the first vehicle, a drive of at least one of the first vehicle or the second vehicle in order to increase the current width of the passage at least to the required width of the passage. The advantages and special features of the system according to the disclosure for adapting of a passage between two vehicles are thus also implemented in the scope of a suitable method.

SUMMARY OF THE DRAWINGS

Further advantages of the present disclosure are apparent from the detailed description and the figures. The disclosure will also be explained in greater detail hereinafter in conjunction with the following description of exemplary embodiments with reference to the appended drawings. In the figures.

DESCRIPTION

It will be understood that other embodiments can be used and structural or logical modifications can be performed without deviating from the scope of protection of the present disclosure. It is further to be understood that the features of the various exemplary embodiments described above and hereinafter can be combined with one another, if not specifically indicated otherwise. The description is therefore not to be understood in a restrictive sense and the scope of protection of the present disclosure is defined by the appended claims.

Figure 1:
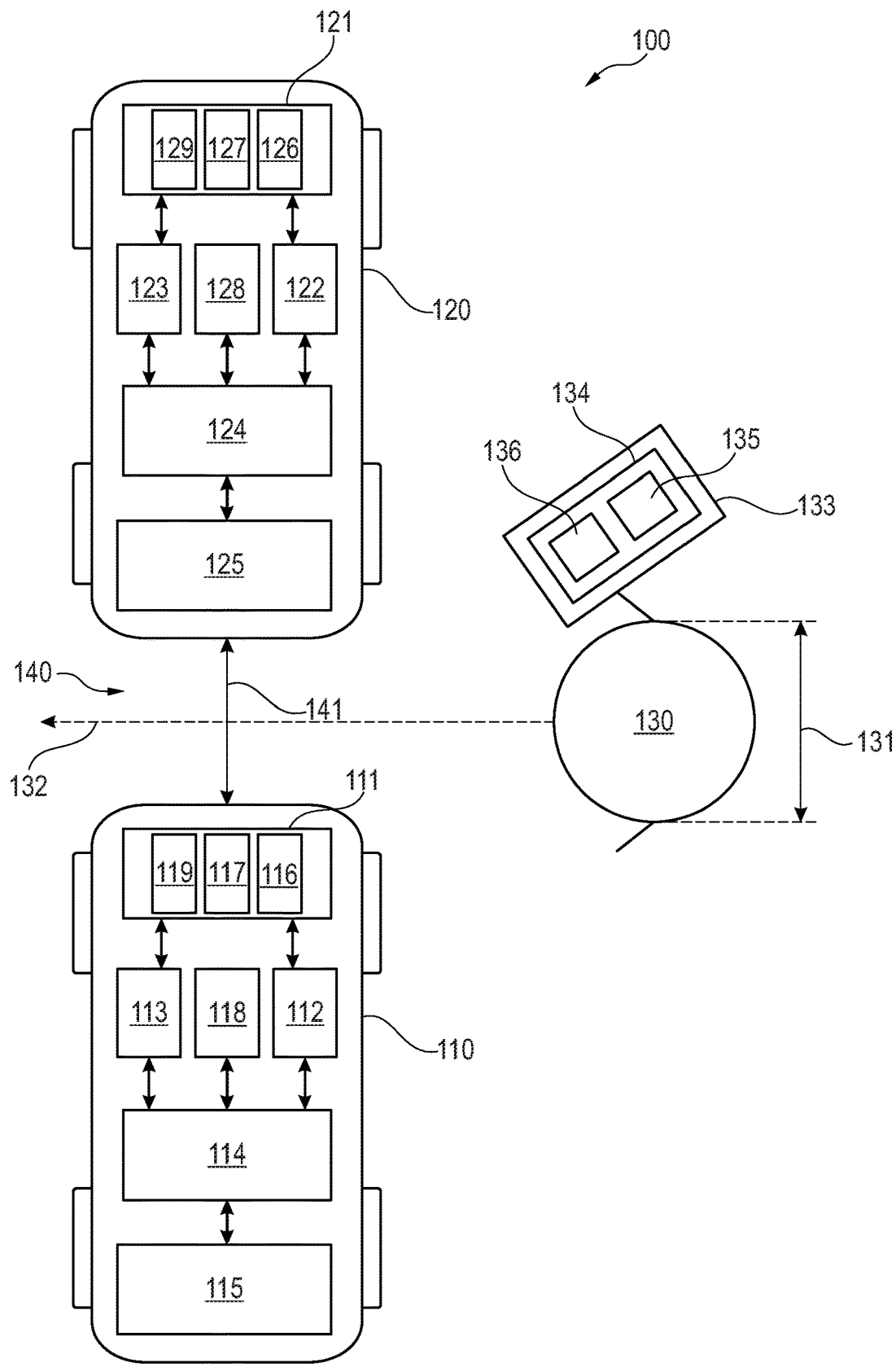
FIG. 1 shows a schematic illustration of an example of a system for adapting a passage between two vehicles according to one embodiment in a first traffic situation.

A schematic illustration of an example system 100 for adapting a passage between two vehicles is shown according to one embodiment of the disclosure in a first traffic situation in FIG. 1. The system 100 comprises a passage need determination device 111 of a first vehicle 110, which is configured to determine an intention of a road user 130 to traverse a passage 140 between the first vehicle 110 and a second vehicle 120. In the embodiment shown, the passage need determination device 111 is configured, on the one hand, to determine the intention of the road user 130 using image analysis methods. For this purpose, the passage need determination device 111 has at least one camera sensor unit 116 and a programmable device 117 at least having a processor and a memory, which is configured to carry out an analysis method to detect the road user 130 and to determine their intention to traverse the passage 140 between the first vehicle 110 and the second vehicle 120 in current recordings of the camera sensor unit 116, for example, in that an intended movement path 132 is estimated from the positions of the road user 130 over time or a gesture (for example, pointing in the intended direction). In the embodiment shown, the passage need determination device 111 additionally has a data communication interface, via which passage need displays can be received from road users 130 via a wireless communication connection if the road user 130, as in the embodiment shown, has a passage need display device 133, which comprises a portable programmable device 134. In this case, this can be, for example, a smart phone, which is suitably configured by the execution of an app to receive the desire from the road user 130, who is a pedestrian in the embodiment shown, via the user interface 135 to traverse the passage 140 between the first vehicle 110 and the second vehicle 120, wherein then this is transmitted via the data communication interface 136 of the portable programmable device 134 to the data communication interface 119 of the first vehicle 110.

The first vehicle 110 additionally has a distance need determination device, which determines a required width 131 of the passage 140 based on a nature of the road user 130. The required width 131 of the passage 140 is shown as a width of the cross section of the road user 130 in FIG. 1. This represents an absolute minimum. The required width 131 is preferably larger than the actual cross section, so that the road user 130 could comfortably traverse the passage 140 without touching the vehicles 110, 120, for example, at least 10% or 20% larger than the minimum required width 131. The nature of the road user 130, i.e., in the example shown the width of the cross section of the road user 130 as the required width 131, can be determined in the embodiment shown by the programmable device 117 of the passage need determination device 111, which is configured to determine the nature of the road user 130 on the basis of the current recordings of the camera sensor unit 116 and to transmit it to the distance need determination device 112. The nature of the road user 130 can also be input therein in the embodiment shown via the user interface 135 of the portable programmable device 134 of the passage need display device 133 and transmitted via the data communication interfaces to the distance need determination device 112. For this purpose, the distance need determination device 112 itself can have a data communication interface or, as in the example shown, can receive the data indirectly via the data communication interface 119 of the passage need determination device 111.

The actual current width 141 of the passage 140 is acquired using a distance determination device 113. For this purpose, the distance determination device 113 can have, for example, separate distance sensors, or the current width 141 is obtained by evaluating the camera recordings of the camera sensor unit 116.

The distance control device 114 of the first vehicle 110 receives the current width 141 and the required width 131 of the passage 140 and checks whether the current width 141 is less than the required width 131. If this is the case, the distance control device 114 can actuate the drive 115 of the first vehicle and set the first vehicle 110 into motion, in order to enlarge the passage 140 to the required width 131.

In addition, the current operating state of the first vehicle 110 is determined using an operating state determination device 118, so that the distance control device 114 takes this into consideration. The drive 115 thus, for example, does not have to be actuated if the first vehicle 110 is in motion, but rather possibly, for example, has to be stopped if it moves toward the road user 130, for example, because presently an automatic parking maneuver is being carried out.

In the embodiment shown, the second vehicle 120 also has corresponding separate components having identical functions, i.e., a passage need determination device 121 having a camera sensor unit 126, a programmable device 127, and a data communication interface 129, and also a distance need determination device 122, a distance determination device 123, an operating state determination device 128, and also a separate distance control device 124 and a drive 125.

In the embodiment shown, the vehicles 110, 120 are connected to one another via V2V communication and the distance control device 114 of the first vehicle 110 is configured, alternatively or additionally to activating the drive 115 of the first vehicle 110, to actuate the drive 125 of the second vehicle 120 and/or to instruct the distance control device 124 of the second vehicle 120 to actuate the drive 125 of the second vehicle 120, in order to move the second vehicle 120 and thus to enlarge the current width 141 of the passage 140 at least to the required width 131. This takes place, for example, if the movement of the first vehicle 110 alone is not sufficient to enlarge the passage 140 sufficiently.

It is true both for the first vehicle 110 and also the second vehicle 120 and possibly also further vehicles of the system 100 that the listing of the components of the system on board a vehicle only has exemplary character. In other embodiments, some or all of the devices are implemented in a single control device, which has a programmable device and is connected, for example, via a vehicle bus to the onboard sensors.

Figure 2:
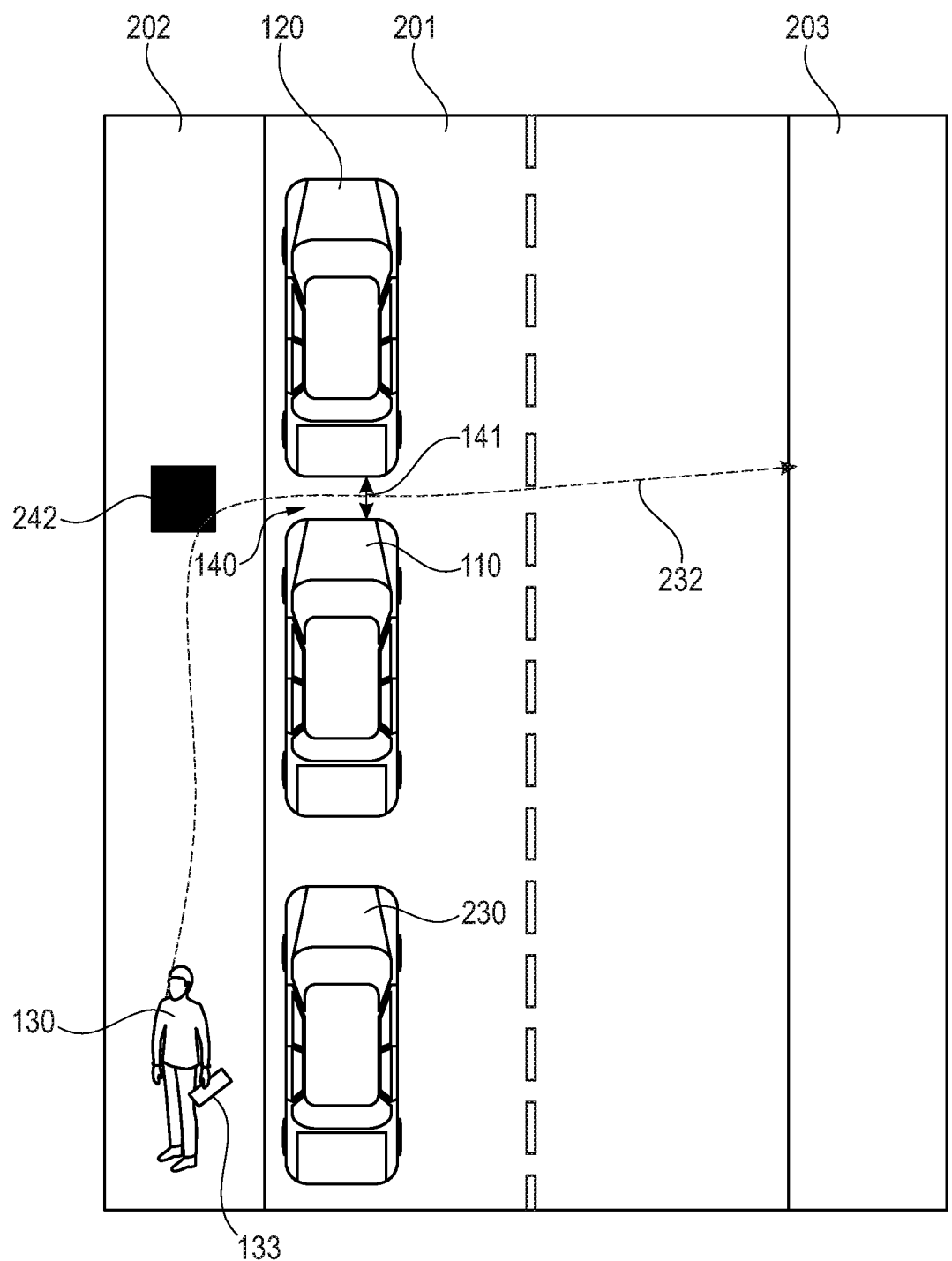
FIG. 2 shows a schematic illustration of the example of a system for adapting a passage between two vehicles according to FIG. 1 in a second traffic situation.

A schematic illustration of the example of a system for adapting a passage between two vehicles according to FIG. 1 is shown in a second traffic situation in FIG. 2. In this case, identical or similar components are identified by the same reference signs as in FIG. 1. In FIG. 2, the first vehicle 110 and the second vehicle 120 are stopped in succession at the left edge of a roadway 201, wherein a passage 140 having a current width 141 is present between the two vehicles 110, 120. In addition, a further vehicle 230 is stopped behind the first vehicle 110. In the example shown, the road user 130 is a pedestrian on a first sidewalk 202, who intends to cross the roadway 201 and change to the second sidewalk 203 on the other roadway 201 side. The road user 130 carries a smart phone, which is configured as a passage need display device 133 by the execution of a suitable app. In the example shown, the passage need display device 113 offers the functionality that the road user 130 displays via this both his passage need and also his nature, for example, in the form of a class specification "single person", which is then associated with a value for the required width 131 of the passage 140. In addition, the road user 130 can select, via the passage need display device 133, a passage position 242 at which he intends to cross the roadway 201. The intended movement path 232 is shown as an arrow having interrupted line in FIG. 2. If the passage need determination device 111 of the first vehicle 110 receives a signal that the road user 130 displays a passage need at the passage position 242, firstly the current operating state is determined using the operating state determination device 118 of the first vehicle 110 and it is ensured that the first vehicle 110 is in a state in which it could not potentially harm the road user 130. If the first vehicle 110 is not at a standstill, the first vehicle 110 is brought to a standstill and it is ensured that the first vehicle 110 only moves backward during the possibly required passage widening. The first vehicle 110 determines, using its distance determination device 113, the current width 141 of the passage 140 and if the current width 141 is less than the required width 131 transmitted via the passage need display device 133, the drive 115 is actuated by the distance control device 114 of the first vehicle 110 and the first vehicle 110 is moved back longitudinally until the current width 141 at least corresponds to the required width 131. The first vehicle 110 is configured for this purpose to contact the second vehicle 120 and/or the further vehicle 230 via V2V communication (V2V—vehicle to vehicle communication) and if enough space is not present for a sufficient movement of the first vehicle 110, to request that the contacted vehicle 120, 230 is moved until the current width 141 at least corresponds to the required width 131 or until the first vehicle 110 can move backwards sufficiently far. As soon as the current width 141 of the passage 140 at least corresponds to the required width 131, a signal or a message is sent to the road user 130 on his passage need display device 133 that the passage widening is completed. In one embodiment of the system, it is provided that the original positions of the vehicles 110, 120, 230 are stored and after completion of the roadway crossing of the road user 130, the vehicles 110, 120, 230 are moved back into their original positions.

Figure 3:
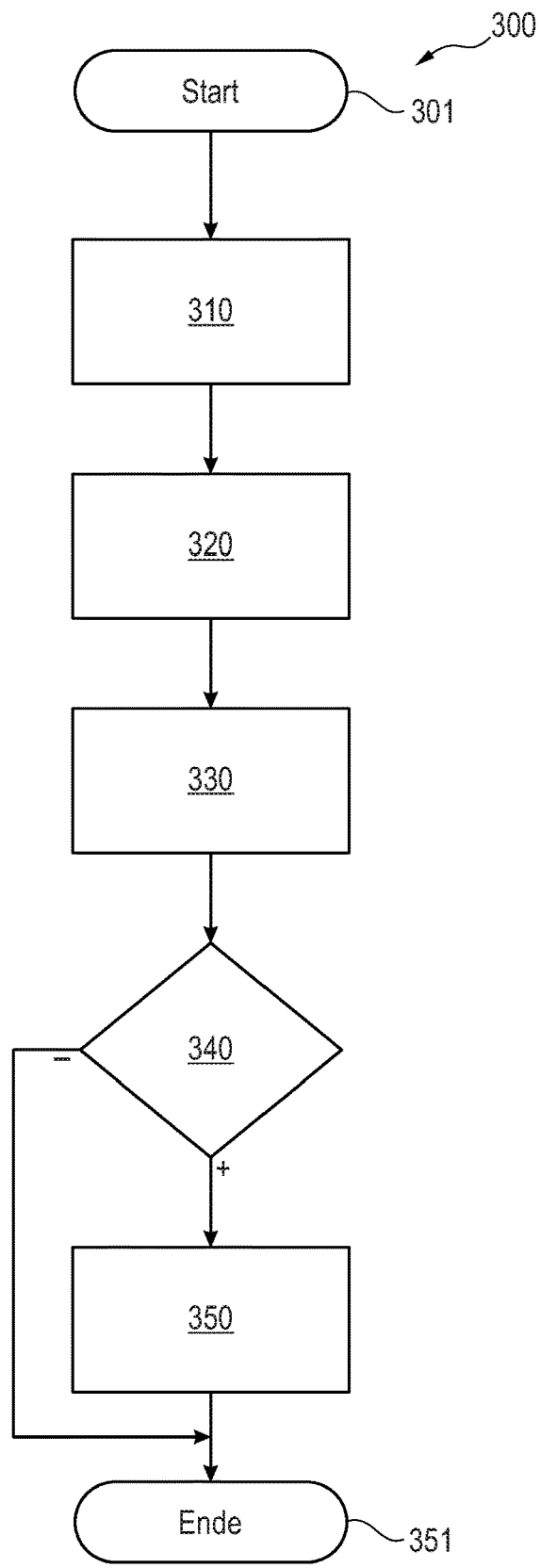
FIG. 3 shows a schematic illustration of an example of a method for adapting a passage between two vehicles according to a further embodiment of the invention.

A schematic illustration of an example of a method for adapting a passage between two vehicles according to a further embodiment of the invention is shown in FIG. 3, which is carried out, for example, using a system according to FIG. 1. The method 300 begins in a starting state 301. In a first step, a determination 310 is carried out, using a passage need determination device 111 of a first vehicle 110, of an intention of a road user 130 to traverse a passage 140 between the first vehicle 110 and a second vehicle 120. A determination 320 follows thereon, using a distance need determination device 112 of the first vehicle 110, of a required width 131 of the passage 140 based on a nature of the road user 130, and a determination 330, using a distance determination device 113 of the first vehicle 110, of a current width 141 of the passage 140. In a next step, a check 340 is carried out of whether the current width 141 of the passage 140 is less than the required width 131 of the passage 140. If the current width 141 is less than the required width 131, illustrated in FIG. 3 by a "+", an actuation 350, using a distance control device 114 of the first vehicle 110, of a drive 115, 125 of at least one of the first vehicle 110 or the second vehicle 120 is carried out in order to increase the current width 141 of the passage 140 at least to the required width 131 of the passage 140. The method 300 then changes into the end state 351, wherein the end state 351 can be an idle state, in which the passage need determination device 111 waits and checks as to whether a passage need is again recognized, so that the method 300 is then executed again. The end state 351 can also comprise reversing vehicle movements initially carried out after the road user 130 traverses the passage 140. If the current width 141 is not less than the required width 131, illustrated in FIG. 3 by a "−", the method 300 changes directly into the end state 351, since the current width 141 of the passage 140 is sufficient to let through the road user 130.

It will be understood that method steps, although described according to a certain ordered sequence, could partially be executed in a sequence other than that described here. It is furthermore to be understood that certain steps can be carried out simultaneously or in succession, once or multiple times, that other steps could be added, or that certain steps described here could be omitted. In other words: The present descriptions are provided for the purpose of illustrating specific embodiments and are not to be understood as a restriction of the disclosed subject matter.

The figures are not necessarily accurate in detail and scale and can be illustrated enlarged or reduced in size to offer a better overview. Therefore, functional details disclosed here are not to be understood as restrictive, but rather merely as an illustrative foundation which offers an instruction to a person skilled in the art in this field of technology in order to use the present invention in manifold ways.

The expression "and/or" used here, if it is used in a series of two or more elements, means that each of the listed elements can be used alone, or any combination of two or more of the listed elements can be used. For example, if a combination is described that contains the components A, B, and/or C, the combination can contain A alone; B alone; C alone; A and B in combination; A and C in combination; B and C in combination; or A, B, and C in combination.

Although the disclosure was illustrated and described in greater detail by the exemplary embodiments, the disclosure is not thus restricted by the disclosed examples and other variations can be derived therefrom by a person skilled in the art without leaving the scope of protection of the disclosure. The disclosure is therefore not to be restricted to individual embodiments, but rather solely by the appended claims.

LIST OF REFERENCE NUMERALS

100 system for needs-oriented adaptation of a passage between two vehicles
110 first vehicle
111 passage need determination device
112 distance need determination device
113 distance determination device
114 distance control device
115 drive
116 camera sensor unit
117 programmable device
118 operating state determination device
119 data communication interface
120 second vehicle
121 passage need determination device
122 distance need determination device
123 distance determination device
124 distance control device
125 drive
126 camera sensor unit
127 programmable device
128 operating state determination device
129 data communication interface
130 road user
131 required width
132 intended movement path
133 passage need display device
134 portable programmable device
135 user interface
136 data communication interface of the portable programmable device
140 passage
141 current width
201 roadway
202 first sidewalk
203 second sidewalk
230 further vehicle 232 intended movement path
242 passage position
300 method for needs-oriented adaptation of a passage between two vehicles
301 starting state
310 determination of an intention of a road user to traverse the passage
320 determination of a required width of the passage in dependence on a nature of the road user
330 determination of a current width of the passage
340 check of whether the current width of the passage is less than the required width of the passage
350 actuation of a drive
351 end state

The invention claimed is:

1. A system for adapting a passage between two vehicles, comprising a control device configured to:
determine an intention of a human road user to traverse a passage between a first vehicle and a second vehicle based on image data, including a gesture of the human road user;
determine a required width of the passage based on a width of the human road user;
determine a current width of the passage; and
upon determining the current width of the passage is less than the required width of the passage, actuate a drive of at least one of the first vehicle or the second vehicle to increase the current width of the passage at least to the required width of the passage.

2. The system according to claim 1, wherein the control device is further configured to determine the width of the human road user based on the image data.

3. The system according to claim 1, wherein the gesture of the human road user is a pointing gesture.

4. The system according to claim 1, wherein the control device is further configured to determine the intention to traverse the passage based on an intended path of the human road user.

5. The system according to claim 1, wherein the control device is further configured to determine the intention to traverse the passage additionally based on a message from a portable device.

6. The system according to claim 5, wherein the portable device includes at least a user interface configured to receive the passage need of the human road user and a data communication interface configured to transmit at least the passage need at least to the control device.

7. The system according to claim 6, wherein the user interface of the portable device is additionally configured to receive the width of the human road user and the data communication interface of the portable device is also configured to transmit the width of the human road user to the control device.

8. The system according to claim 5, wherein the message is an optical message that specifies a passage need in a direction selected by the human road user.

9. The system according to claim 1, wherein the control device is further configured to upon determining an operating state of the first vehicle, actuate the drive of the first vehicle based on the operating state of the first vehicle.

10. The system according to claim 1, wherein the human road user is a pedestrian, a wheelchair user, a bicyclist, a scooter rider with a scooter, or a motorcyclist.

11. The system according to claim 1, wherein the control device is further configured to request a further vehicle actuate a drive of the further vehicle when the current width of the passage between the first vehicle and the second vehicle cannot be increased to the required width of the passage by actuating the drives of the first vehicle and the second vehicle, the further vehicle being adjacent to the first or the second vehicle.

12. A method for adapting a passage between two vehicles, comprising:
determining an intention of a human road user to traverse a passage between a first vehicle and a second vehicle based on image data, including a gesture of the human road user;
determining a required width of the passage based on a width of the human road user;
determining a current width of the passage; and
based on the current width of the passage being less than the required width of the passage, actuating a drive of at least one of the first vehicle or the second vehicle to increase the current width of the passage at least to the required width of the passage.

13. The method of claim 12, further comprising determining the width of the human road user based on image data.

14. The method of claim 12, wherein the gesture of the human road user is a pointing gesture.

15. The method of claim 12, further comprising determining the intention to traverse the passage based on an intended path of the human road user.

16. The method of claim 12, further comprising determining the intention to traverse the passage additionally based on a message from a portable device.

17. The method of claim 16, wherein the portable device includes at least a user interface configured to receive at least one of the passage need of the human road user or the width of the human road user, and a data communication interface configured to transmit at least one of the passage need or the width to a control device of the first vehicle.

18. The method of claim 12, further comprising requesting a further vehicle actuate a drive of the further vehicle when the current width of the passage between the first vehicle and the second vehicle cannot be increased to the required width of the passage by actuating the drives of the first vehicle and the second vehicle, the further vehicle being adjacent to the first or the second vehicle.

19. The method of claim 12, further comprising, upon determining an operating state of the first vehicle, actuating the drive of the first vehicle based on the operating state of the first vehicle.

20. The method of claim 12, wherein the human road user is a pedestrian, a wheelchair user, a bicyclist, a scooter rider with a scooter, or a motorcyclist.

* * * * *